May 23, 1967     K. EICKMANN     3,320,897
FLUID HANDLING ROTARY VANE MACHINE
Filed Dec. 24, 1964     7 Sheets-Sheet 1

INVENTOR.
KARL EICKMANN
BY Burgess, Dinklage & Sprung
ATTORNEYS

May 23, 1967   K. EICKMANN   3,320,897
FLUID HANDLING ROTARY VANE MACHINE
Filed Dec. 24, 1964   7 Sheets-Sheet 4

INVENTOR.
KARL EICKMANN
BY Burgess, Dinklage & Sprung
ATTORNEYS

May 23, 1967 K. EICKMANN 3,320,897
FLUID HANDLING ROTARY VANE MACHINE
Filed Dec. 24, 1964 7 Sheets-Sheet 5

INVENTOR.
KARL EICKMANN
BY Burgess, Dinklage & Sprung
ATTORNEYS

May 23, 1967

K. EICKMANN 3,320,897

FLUID HANDLING ROTARY VANE MACHINE

Filed Dec. 24, 1964

INVENTOR.
KARL EICKMANN
BY
Burgess, Dinklage & Sprung
ATTORNEYS

May 23, 1967

K. EICKMANN 3,320,897

FLUID HANDLING ROTARY VANE MACHINE

Filed Dec. 24, 1964

INVENTOR.
KARL EICKMANN
BY
Burgess, Dinklage & Sprung
ATTORNEYS

United States Patent Office 3,320,897
Patented May 23, 1967

3,320,897
FLUID HANDLING ROTARY VANE MACHINE
Karl Eickmann, 2420 Isshiki, Hayama-machi,
Kanagawa-ken, Japan
Filed Dec. 24, 1964, Ser. No. 420,993
Claims priority, application Germany, Jan. 2, 1964,
E 26,148
37 Claims. (Cl. 103—120)

This invention relates to a fluid handling rotary vane machine, wherein vanes are moving substantially radially in slots of a rotor and wherein the center portions of the vanes are guided in slot portions of a radially enlarged medial rotor part.

In the former classical type of rotary vane machines the vanes were moving out of the slots for separating the intervane spaces in the working chamber and thereby such vanes were caused to tilt under the high tangential forces of fluid under pressure which were acting against the vanes. Thereby the stroke of the vanes was rather limited.

In newer types of fluid handling devices such as rotary engines, fluid transmissions, fluid motors or pumps as for instance are disclosed in my U.S. Patent No. 2,975,716, the vanes are borne in slots in the side wall members of the rotor and thereby tilting of the vanes is prevented. However such kinds of fluid handling devices as disclosed in my said U.S. patent can be realized only, if either the rotor or the casing is made of at least two parts and thereafter precisely assembled together.

Therefore such kind of fluid handling devices are needed in manufacturing and are still of a certain complication so that they can be manufactured practically only for larger horsepower units.

The above mentioned difficulties will be overcome by the present invention, which provides a most simple and most compact fluid handling device wherein the vanes are prevented from tilting.

It is an object of the invention to provide a compact and a most simple fluid handling device wherein the intervane spaces are separated from each other by vanes which extend into or through the working chambers.

Another object of the invention is to provide a one-piece rotor with an enlarged radial rotor part.

Another object of the invention is to guide the medial portions of the vanes in respective slots of the enlarged medial rotor part.

A further object of the invention is to provide a radially balanced rotor means, so that the rotor means floats between radially and oppositely directed forces of fluid under pressure.

A still further object of the invention is to provide a fluid handling device with a plurality of working chambers, a so-called multiple working chamber fluid handling device, wherein each of the working chambers is divided by vanes into a plurality of intervane spaces which intake or expel fluid.

Still another object of the invention is to provide the acting working chamber or intervane spaces in such a way in the vicinity of the rotor means that the forces of fluid out of different chambers of them are acting partially or totally radially contrary to each other and against the rotor means.

Another object of the invention is to provide the flow of fluid into and out of the intervane spaces or working chambers in the axial direction.

A further object of the invention is to provide the flow of fluid in a radial direction into the working chambers or slot chambers outwards of the medial vane portions in the enlarged medial rotor part.

A further object of the invention is to provide for the flow of fluid into and out of the rotor slots in axial direction.

A still further object of the invention is to provide slide elements on the axial extensions of the vanes which are borne on a respective pivot pin and which are able to pivot in a limited extent around the pivot pin of the vane.

Another object of the invention is to provide end faces on the vanes, pivot pins or slide elements or parts of the rotor for sliding along respective control faces of cover means or other control face means.

Another object of the invention is to provide a fluid handling device wherein a plurality of flows are acting or are produced.

Still another object of the invention is to provide a plurality of fluid handling devices of the invention which can be connected axially behind each other so that all of them are driven by the same driving means, such as an electric motor, engine or turbine, in such a way, that the shaft means of one device drives the next.

Another object of the invention is, to provide a fluid handling device wherein the rotor is floating between radially or axially directed forces so that anti-friction bearings are unnecessary or can be avoided.

It is another object of the invention to provide axial balancing means on a fluid handling device which press respective parts in the fluid handling device together.

A still further object of the invention is to provide a fluid pressure balance on the vane means or on the slide elements.

It is another object of the invention to provide casing members between a cover means and the medial casing or between respective end faces of such medial casing and cover means or casing means.

Another object of the invention is to provide the said casing members either fixed or adjustable.

A still further object of the invention is to provide a simple vane in the fluid handling device so that due to the simple vane several intervane spaces and interslot spaces are combined together to a respective working space whereby the vane separates one working chamber from the other, while the medial vane part is guided in a slot portion of the radially enlarged medial rotor part.

It is another object of the invention to provide a fluid handling device which has a rotor with an enlarged medial rotor part and with slot means extending in axial direction through the rotor means while the said slot means are closed radially inwardly and within the medial rotor part also radially outwardly.

Other objects and features of the invention will become apparent from the following description taken in connection with the accompanying drawings which illustrate several embodiments of the invention.

Figure 15:
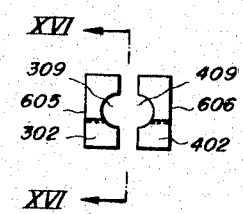

More in detail:

FIG. 15 shows a view on the vane of the embodiment from one axial end.

Figure 16:
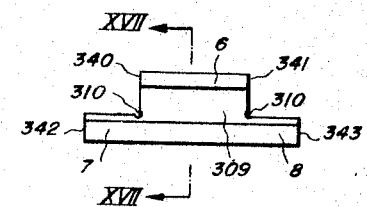

FIG. 16 shows a longitudinal view on a part of the vane of FIG. 15 shown along the arrow XVI.

Figure 17:
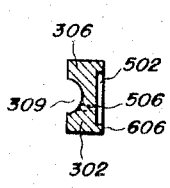
FIGS. 15 to 17 represent another embodiment of a vane of the invention which can be assembled into the fluid handling device of this invention and wherein the vane is divided into two parts and wherein these parts are separately shown.

FIG. 17 is a cross sectional view through FIG. 16 taken along the line XVII—XVII.

Figures 18, 19:
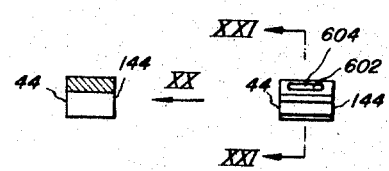

FIGS. 18 to 21 show an embodiment of the slide element, which can be assembled into the fluid handling device, in separated illustration;

More in detail:

FIG. 18 is a view on a slide element of the invention.

FIG. 19 is a longitudinal view through FIG. 18, taken along the line XIX—XIX.

Figure 20:
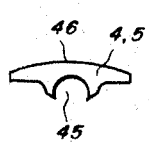

FIG. 20 shows the slide element of FIG. 18, seen from one of its axial ends.

Figure 21:
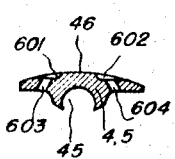

FIG. 21 is a cross sectional view through FIG. 18 taken along the line XXI—XXI.

Figure 23:
Figure 22:
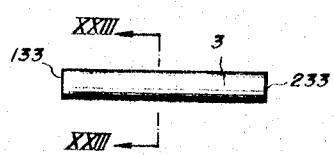

FIGS. 22 and 23 show a pivot pin, of the vane assembly of an embodiment of the invention, in separated illustration;

More in detail:

FIG. 22 shows the pivot pin in a longitudinal view.

FIG. 23 is a cross sectional view through FIG. 22 taken along lines XXIII—XXVIII.

Figure 24:
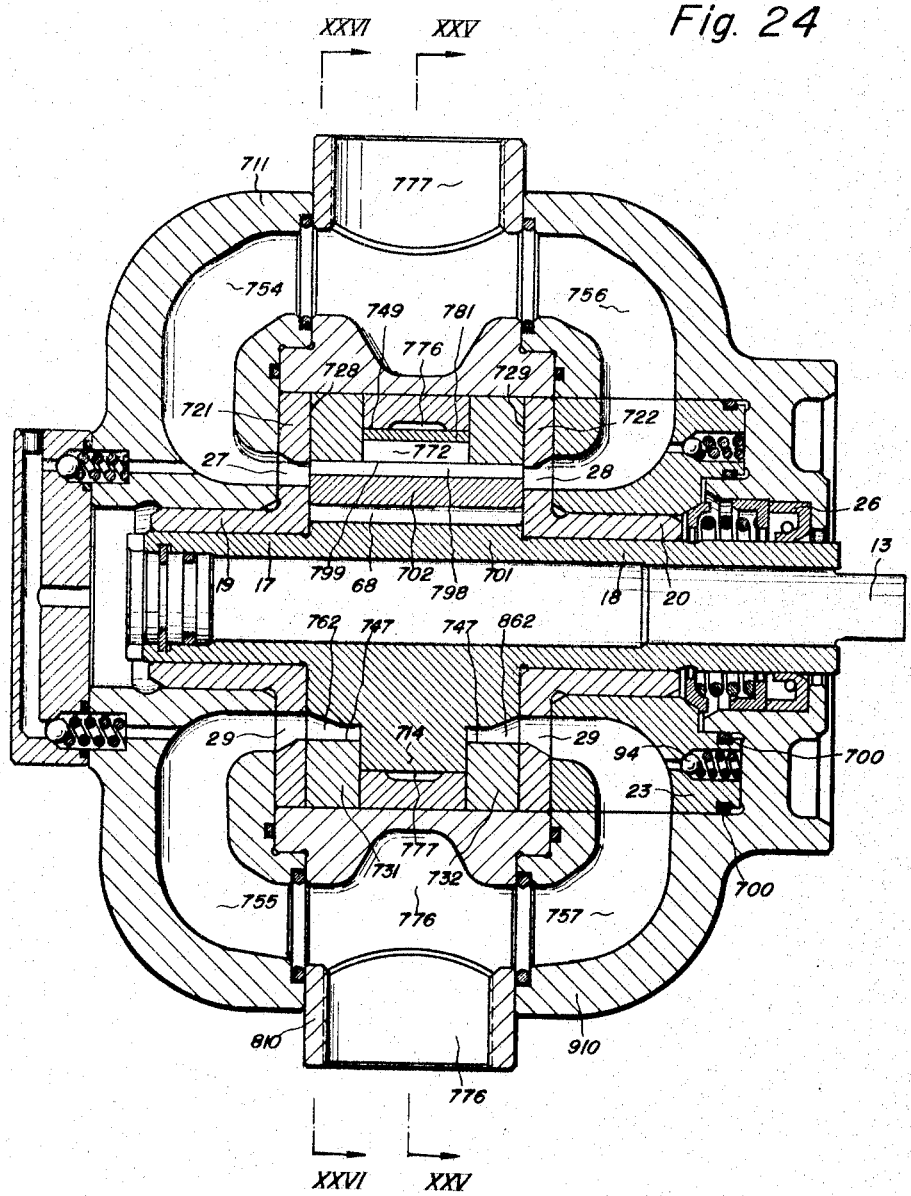

FIG. 24 is a longitudinal sectional view through another embodiment of the fluid handling device of the invention.

Figure 25:
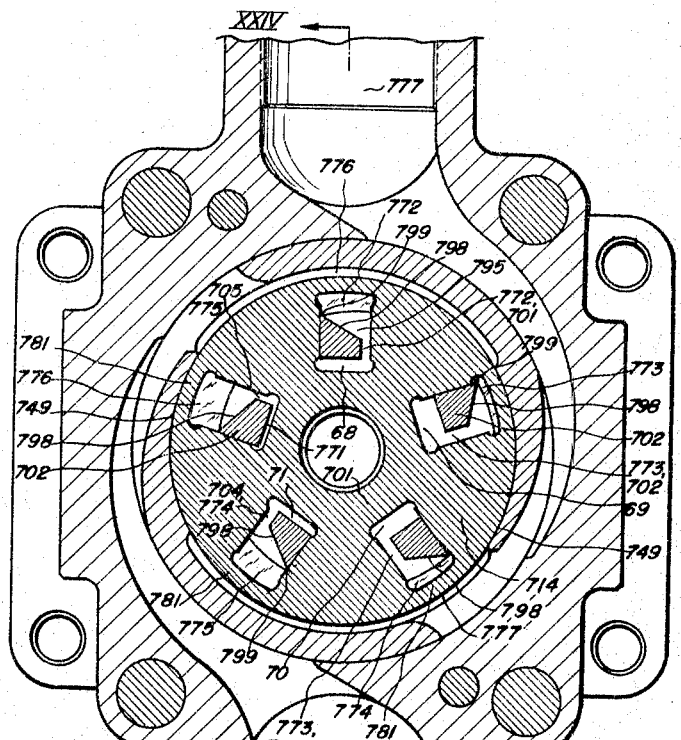

FIG. 25 is a cross sectional view through FIG. 24 taken along line XXV—XXV.

Figure 26:
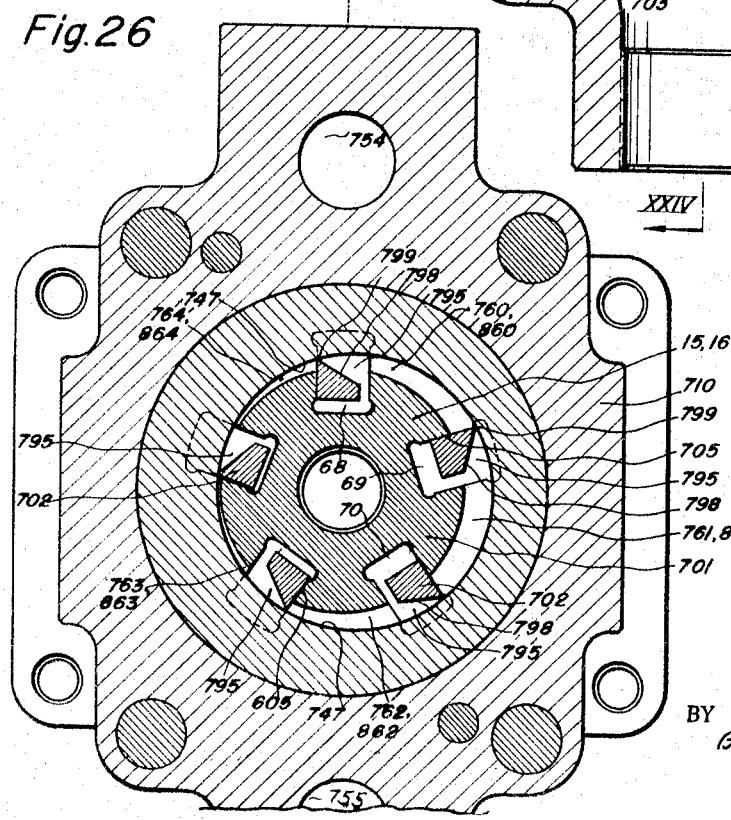

FIG. 26 is a cross sectional view through FIG. 24 along the line XXVI—XXVI.

Figure 1:
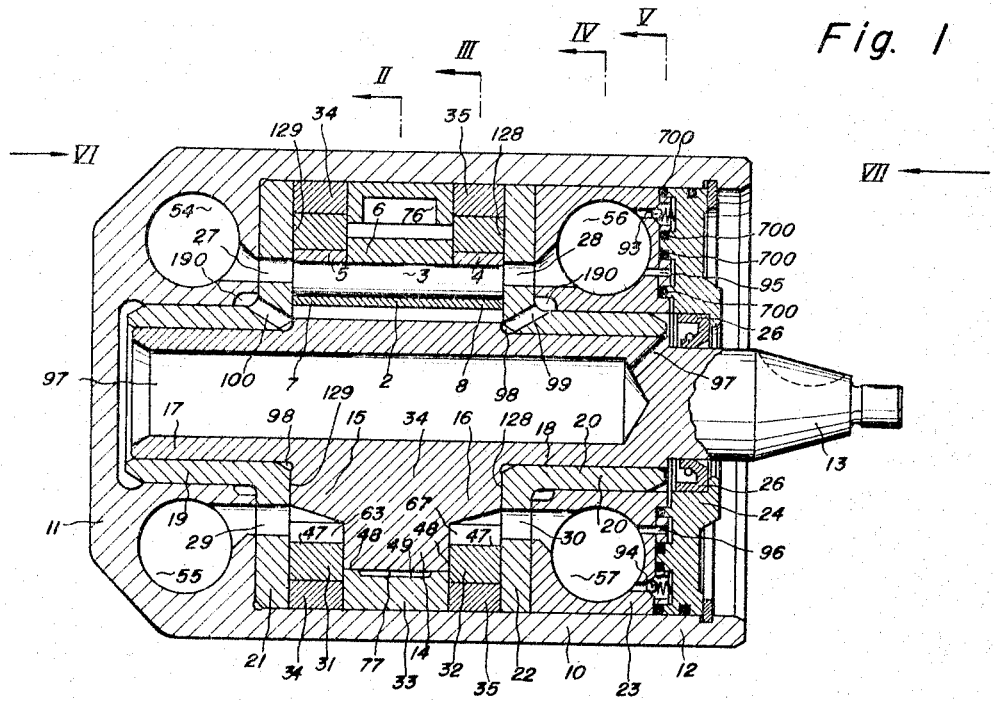
FIGURE 1 is a longitudinal sectional view through an embodiment of fluid handling device.

In FIGURE 1, the housing 10 contains the inner parts of the fluid handling device of an embodiment of the invention. Rotor 1 is rotatably mounted in the housing 10 and borne in respective bearings 19 and 20. The rotor is provided with shaft portions 17 and 18 whereof the shaft portions 18 extends into the drive shaft 13. The cover means 24 retains all parts in the fluid handling device and is retained in housing 10 by the retaining means 25. Shaft seal 26 is contained in the outer cover 24 and seals the drive shaft 13 and the whole machine against leakage outflow.

The detailed locations and functions of the parts inside of the assembly of the new fluid handling device, which is demonstrated in FIGURES 1 to 7, will be more easily understood if they are compared with the parts which are shown in separate illustrations in FIGURES 8 to 23, wherein similar parts are cited by the same reference numerals.

Figure 8:
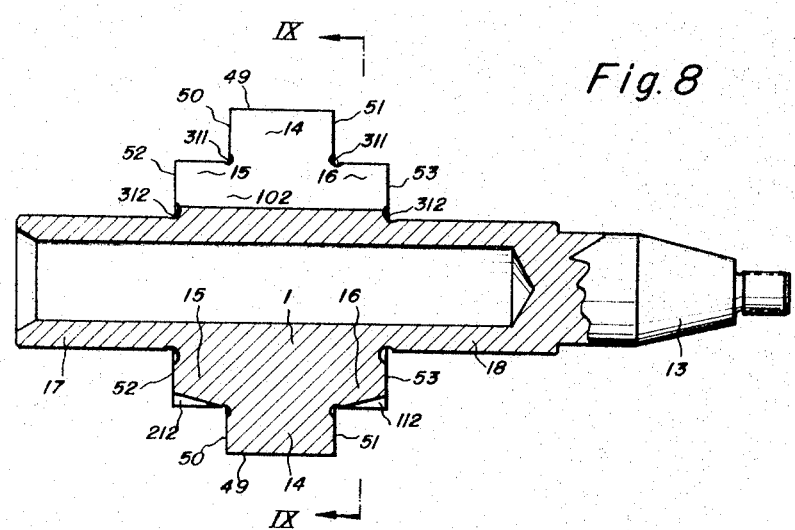
FIGURE 8 is a longitudinal sectional view through an embodiment of the rotor of the fluid handling device separately shown.
Figure 9:
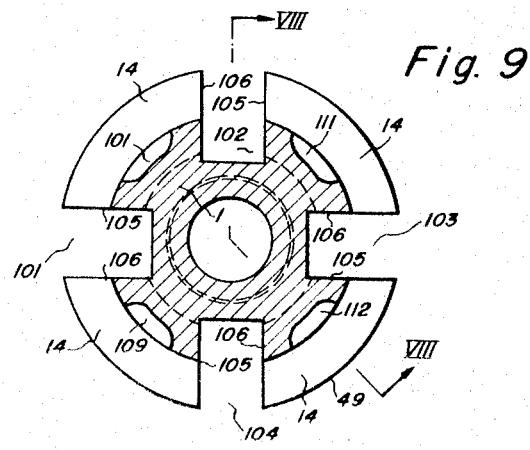
FIGURE 9 is a cross sectional view through FIG. 8, taken along the line IX—IX.

Referring first to the rotor 1 it can be seen from FIGURES 8 and 9 that the rotor has a forward rotor part 16 and a backward rotor part 15 wherebetween the radially enlarged medial rotor part 14 is located. The radially enlarged medial rotor part 14 extends in radial direction outwardly beyond the forward rotor part 16 and the backward rotor part 15. The shaft portion 17 extends in axial direction backward from the backward rotor part 15 while the shaft portion 18 extends in axial direction forward from the forward rotor part 16 and extends therefrom as the driveshaft 13.

The intersecting grooves or annular recesses 312 can be provided between the respective shaft portions and the respective rotor parts, while also intersecting grooves or intersecting annular recesses 311 may be provided between the forward rotor part 16 and the medial rotor part 14 or the backward rotor part 15 and the medial rotor part 14. The provision of such intersecting grooves or recesses 311 or 312 has a feature, that the respective adjacent cylindrical or radial plane faces can be more accurately machined, pressed, lathed, grinded or lapped.

The substantially radially extending slots or rotor slots designated by reference numerals 101, 102, 103 and 104 are extended in radial directions through the rotor parts, and they extend in the axial direction entirely through the backward rotor part 15, the medial rotor part 14 and the forward rotor part 16. Intersecting grooves or recesses can be provided between the respective slot wall and the slot bottom for making the machining of the slot walls easier.

The slots are provided with guide faces for guiding the vanes. These guide faces are extending substantially over the whole length of the respective slot and they are designated by reference numerals 105 and 106. It is necessary that at least one wall of each slot is made up as a plane guide face for guiding a respective vane.

Radial outward on the radially enlarged medial rotor part 14 is the medial rotor part outer face 49 provided and is preferably of cylindrical configuration. On both axial ends of the enlarged medial rotor part 14 are the respective medial rotor part end faces 50 and 51 provided. On the outer ends of the forward rotor part 16 and of the backward rotor part 15 the transverse rotor end faces 53, respectively 52, are provided. The shaft portions 17 and 18 have referably cylindrical outer faces.

The end faces 50, 51, 52, and 53 are normal to the axis of the rotor and they are radially plane and accurately machined.

The rotor parts 15 and 16 may also be provided with respective passages or recesses 108 to 112 or 208 to 212. The rotor may also be provided with a rotor hub or a rotor bore for reducing the weight of the rotor.

The vanes means will consist in the presently discussed embodiment of the invention of a vane assembly. Such vane assembly has a vane, a pivot pin and two slide elements as demonstrated in FIGURES 10 to 23. The vane 2 has a medial vane portion 6 and two vane extensions 7 and 8 whereof each one extends in axial direction away from the medial vane portion 6. The vane has also a longitudinal vane bed 9 which extends in axial direction entirely through the vane and the vane extensions. The longitudinal vane bed 9 is preferably of cylindrical configuration as can be seen from FIGURE 14. The vane bed 9 is preferably so dimensioned, that the pivot pin 3 can be inserted into vane bed 9 and can fit or pivot therein.

The center line of the vane bed 9 is the vane axis and parallel to the vane axis are provided the plane longitudinal bearing faces 605 and/or 606 of the vane. The bearing faces 605 and/or 606 are in the vane for the purpose that the vane can slide therewith along the guide faces 105 and/or in the rotor 1 and seal thereon. Instead of having two bearing faces, the vane in other embodiments may have only one bearing face 605 or 606. The vane is so dimensioned that it can be inserted into the respective slot of rotor 1. The medial vane portion 6 has on its axial ends the vane's medial portion end faces 40 and 41. Between the vane extensions 7 and 8 and the vane's medial portion end faces 40 or 41 can be the intersecting grooves 310 provided and they are preferably formed as transversal intersecting grooves.

They are provided therefore, that the end faces 40 and 41 can be more accurately machined. On the ends of the vane extensions 7 and 8 are provided the vane end faces 42 respectively 43.

The pivot pin 3 has also end faces designated as the pivot pin end faces 133 or 233 respectively. The vane 2 has preferably the same length as the pivot pin 3 has. Therefore, after the pivot pin 3 is inserted into the longitudinal vane bed 9, the pivot pin end faces 133 and 233 are in the same plane as the vane end faces 42 and 43.

The slide element which is shown in the embodiments of FIGS. 18 to 21 has a longitudinal slide element bed 45, a slide element outer face 46, a slide element inner end face 44 and a slide element outer end face 144. The length of the slide element is as long as the respective vane extension 7 or 8. The slide element bed 45 is so configurated that the pivot pin 3 can be inserted therein and so that the slide element surrounds the pivot pin 3 preferably more than 180 degrees, so that the slide element cannot fall radially away from the pivot pin 3. The slide element outer face 46 is so configurated that it can slide along the preferably cylindrical inner face of the respective casing member 31 or 32.

The slide element end faces 44 and 144 are transverse to the axis of the slide element bed 45 and they are radially plane.

The medial portion 6 of the vane is preferably about twice as long as each of the vane extensions 7 and 8.

One slide element is moved axially inwards upon the pivot pin 3 until the slide element inner face 44 abuts against the medial vane portion end face 41 or 40. The other slide element is moved from the other end over the pivot pin 3 until its end face 44 meets face 41 or 40. Thereafter the vane assembly is completed and then the slide element outer end face 144 is in the same plane as the respective vane end faces or pivot pin end faces 42, 133 or 43 and 233 are. The slide element can pivot or swing around the axis of the pivot pin 3 in a limited extent.

The slide element can also be provided with balancing grooves 601 and 602 and with passages 603 and/or 604 for passing fluid out of the respective intervane space or working chamber into the respective balancing recesses 601 or 602. The vane can also be provided with balancing recesses as will be seen from FIG. 12. The medial vane portion 6 can be provided with a balancing recess 502 or 501 and fluid can be passed into the respective balancing recesses 501 or 502 through respective fluid passages or communication passages 503 and/or 504 which may extend through the vane or parts of the vane assembly for communication with the opposite intervane space or working chamber.

Another embodiment of the vane is shown in FIGURES 15 to 17 and demonstrate a divided vane which is divided into two vane parts 302 and 402. That is specially suitable for dividing the longitudinally vane bed 9 into the vane bed parts 309, and 409. The vane part can be easily ground by surface grinders and the half parts of the vane bed 9, which are cited by reference numbers 309 and 409, can then be exactly ground by surface grinders so that each of them forms a half of a cylindrical hole.

Also on such kinds of divided vanes can respective intersecting grooves 310 be provided as well as balancing recesses, communication passages, end faces and medial portions end faces. The divided vane of FIGURES 15 to 17 has the feature, that it can be easily or automatically machined.

Figure 12:
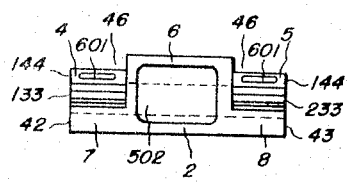
FIG. 12 is a view on FIG. 11 taken along the arrow XII.
Figure 11:
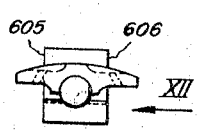
FIG. 11 is a view on FIG. 10 taken along the arrow XI.
Figure 10:
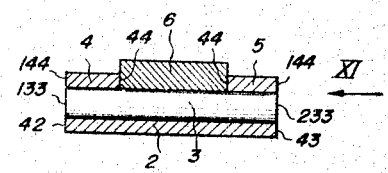
FIG. 10 is a longitudinal sectional view through a vane assembly which can be provided in the fluid handling device of this invention, separately shown.
Figure 14:
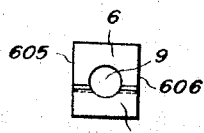
FIG. 14 is a view on the embodiment illustrated in FIG. 13, taken along the arrow XIV.
Figure 13:
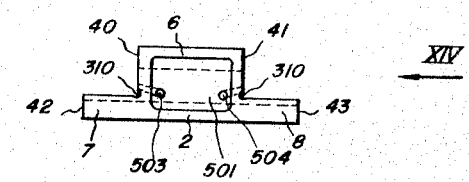
FIG. 13 is a view on the vane of FIG. 10 in longitudinal direction.

FIGURE 12 shows the vane assembly consisting of the vane of FIGURES 13 and 14, the slide elements 4, 5 of FIGURES 18 to 21 and the pivot pin of FIGURES 22 to 23 assembled together into a complete vane assembly wherein all end faces and their cooperation with each other can be seen.

The feature of the heretofore described vane assembly consists therein, that all parts which are sealing inside of the fluid handling device, are surfaces instead of lines and that they have therefore a longer useful life and they provide a more perfect sealing action.

Figure 2:
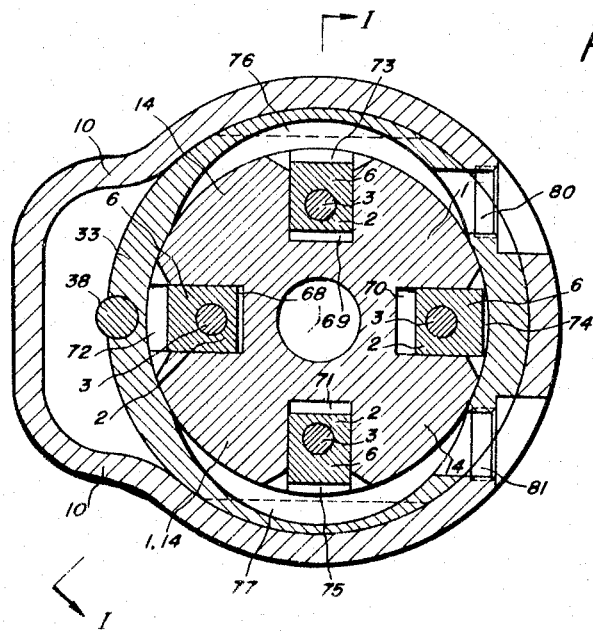
FIGURE 2, FIG. 3, FIG. 4 and FIG. 5 are cross sectional views taken through FIGURE 1 along the line II—II, III—III, IV—IV or V—V respectively.
Figure 3:
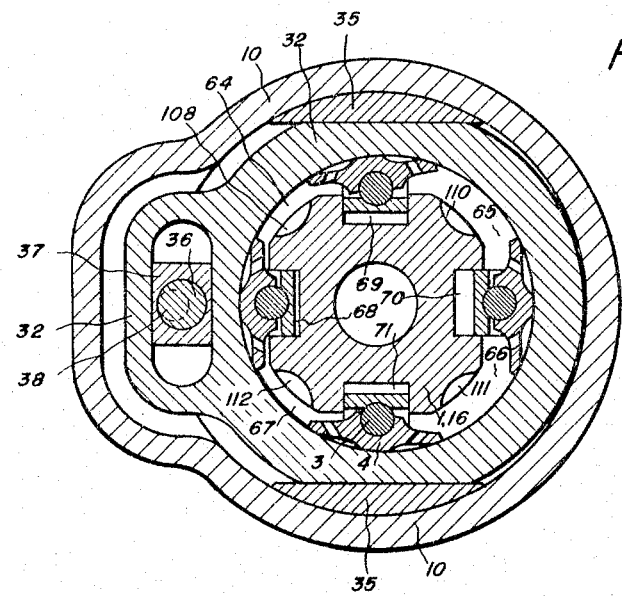
Figure 7:
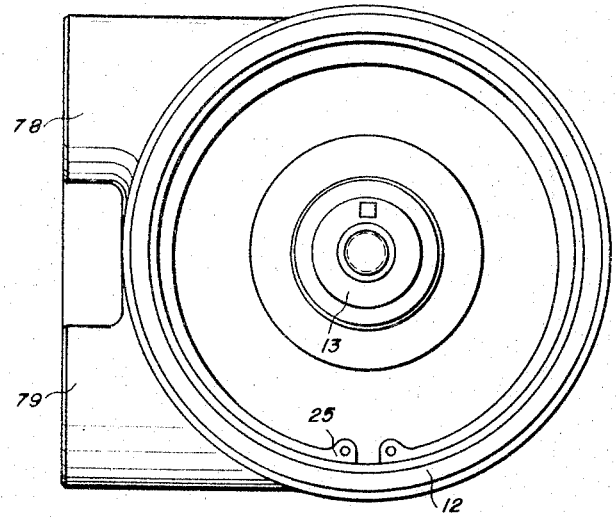

The vane assemblies are inserted into the respective rotor slots. The medial casing 33 is set around the enlarged medial rotor part 14 and fits with its inner face 48 around the outer face 49 of the medial rotor part 14. The clearance between the mentioned two faces is so dimensioned, that the rotor can easily revolve respectively to the medial casing 33 but that an effective seal remains maintained between the said faces. The medial casing 33 is in the embodiment, demonstrated in FIGS. 1, 2 and 7, provided with passages 76 and 77 which also function as radial control ports.

The casing members 31 and 34 are set around the forward rotor part 16 or around the backward rotor part 15 and the said casing member 31 and 32 are provided with casing member inner face 47 which are of such configuration, preferably cylindrical configuration, so that the respective outer faces 46 of the slide elements 4 or 5 can move therealong and seal thereagainst.

Casing members 32 and 31 have the same axial length as the respective forward or backward rotor parts 15 and 16 have. The radially enlarged medial rotor parts 14 has the same length as the medial vane portion 6.

The casing members 31 and 32 may be borne on slide segments 34 and 35 so that the axes of the casing members 31 and 32 can be adjusted so as to coincide with the axis of the rotor or as to become spaced from the axis of the rotor.

The cover means 21 and 22 extend axially against the end faces of the rotor part 15 or 16 and thereby against the end faces of the vanes 2, pivot pins 3, the slide elements 4 or 5 and also against the end faces of the casing members 21 or 32. The cover means 21 and 22 are provided with control faces 128 or 129 which are abutted against the aforementioned end faces of the rotor part, vanes, pivot pins, slide elements and casing members.

The cover means 21 and 22, in the embodiment which is here discussed, are provided also with the bearings 19, 20. The said bearings have cylindrical inner faces for bearing the cylindrical outer faces of the shaft portions 17 and 18 of rotor 1.

The entire assembly of the inner parts of the fluid handling device is inserted into a space in the housing 10 of the device. It is retained therein by the outer cover 24, which is retained in the housing by the retaining means 25.

The fluid ports 80 and 81 are provided on housing 10 and they are extending through the medial casing 33 into the fluid port 26 or 27. Outwards of the respective medial vane portions the outer slot spaces 72, 73, 74, 75 and/or others are formed and they are in communication during substantially one half of a revolution with the fluid port 76 and during the other half of the revolution with the fluid port 77.

Therefore, if the vane moves inwards, then fluid is taken into the respective outer slot spaces and if the vane moves outward fluid is expelled out of the respective outer slot space. During operation of the machine the fluid ports 80, 81 act alternately, one as an entrance port and the other as an exit port.

The cover means 21 and 22 are provided with respective control ports 27, 28, 29 or 30 and the said control ports are communicating with respective fluid passages 54, 55, 56, 57 which are extending directly or indirectly through the housing 10, to a respective fluid port 78, 79, 178 or 179.

Each of the intervane spaces 64, 65, 66, 67, and any other intervane spaces provided, together with the respective passage recesses 108, 109, 110, 111 and 112 move along the control port 28 during about one half of a revolution and during the other half of the revolution, the said intervane spaces and/or passages recesses move, along the control port 30.

At the same time the respective intervane spaces 61, 62, 60 and 63, together with the respective passage recesses 208, 209, 210, 211 and 212 are moving during about half of a revolution along the control port 27 while they are moving substantially during the other half of the revolution along the control port 29.

If the axes of the casing members 31 and 32 are spaced from the axis of the rotor, then during each of the revolutions of the rotor 1 each of the said intervane spaces increase and decrease in volume, thereby intaking and expelling fluid.

The fluid flows from control port 78 through passage 54 into control port 28 and therefrom into the respective intervane spaces 64 to 67 and during the other half of the revolution out from the said intervane spaces through control port 30 and fluid passage 57 to fluid port 79 and then leaves the device. The flow of fluid will be reversed if the eccentricity between the respective casing members and the rotor is reversed or if the revolution of the rotor is not clockwise but counterclockwise. At the same time fluid flows from fluid port 78 through fluid passage 54 and through control port 27 into the respective intervane spaces 60 to 63 during one half of the revolution and it leaves the said intervane spaces during the other half of the revolution through control port 29 and fluid passages 55 to fluid port 179.

If the eccentricity between the respective casing members and the rotor is reversed, then the fluid flow is reversed: and the fluid flow is also reversed, if the rotor, instead of revolving clockwise, revolves counterclockwise.

The fluid which flows through the fluid handling device, as described heretofore, may be liquid or may be gas. In the cases of liquid, the fluid will mostly be water or hydraulic fluid and the fluid handling device will then either preferably act as a water pump, hydraulic pump or liquid pump or as a hydraulic motor, water motor or the like. If gas flows through the machine, then the device may either act as a compressor or as a gas driven motor.

An adjustable cover 23 is preferably provided between the cover means 22 and the outer cover 24. The adjustable cover 23 has the feature that it is able to move in the axial direction to a limited extent. It may be borne inside of the housing and may bear in itself the bearing 20 on or with cover means 22.

One or more fluid containing balancing spaces can be provided between the adjustable cover 23 and the outer cover 24. Fluid under pressure may be passed into the said fluid balancing chambers through respective passages or communication passages 95 or 96 or via respective valves 93 or 94. The fluid may be passed into the said balancing chambers out from the respective passages 56 or 57 or out from other spaces or chambers in the fluid handling device, which contain fluid under pressure. The balancing chambers can be sealed by respective seals 700, so that no fluid can leave the balancing chambers. The balancing chambers are so provided, that a relative axial movement can occur between the outer cover 24 and the adjustable cover 23.

Therefore, if fluid under pressure is present in one or more of the said balancing chambers, then the adjustable cover 23 will be pressed axially against the respective end faces of the rotor, pivot pins, vanes, casing members and guide segments.

Figure 5:
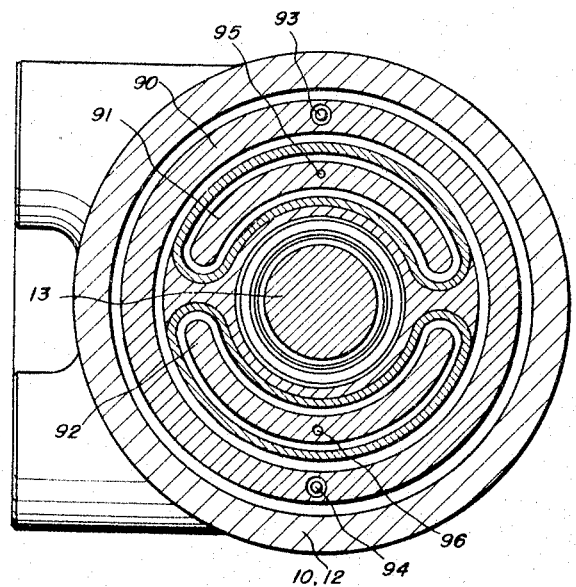
Figure 6:
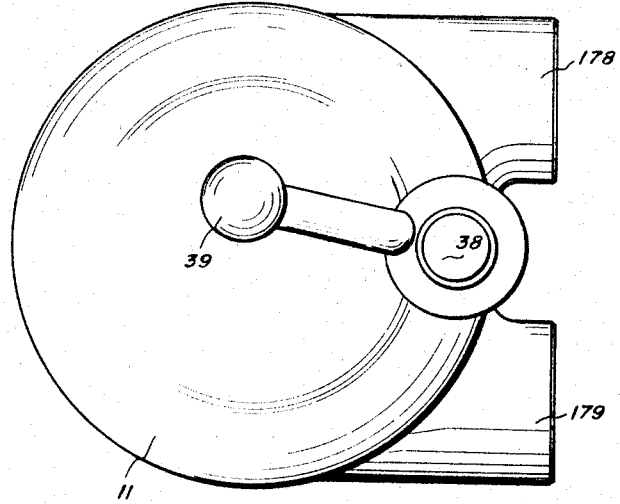

The balancing chambers may be separated from each other, or they may communicate together, depending on the particular design. In FIG. 5 it is shown, that there can be several balancing chambers: for instance, one around the balancing ring 90 and two other around the balancing bodies 91 and 92.

Said balancing bodies 90 to 92 may be inserted into the balancing chambers and they may bear the seals of the balancing chambers. In the embodiment which is shown on the sectional view of FIG. 5, the balancing chambers, which contain balancing body 90, is always under high pressure, while the balancing chamber containing the balancing body 91 is under that pressure which is at the same time present in the fluid passages 56, while inside of the balancing chamber which contains the balancing body 92 such pressure is present, which is acting in the fluid passage 57. The balancing rings or the balancing bodies 90, 91 and 92 may also move axially together with the adjustable cover 23.

Figure 4:
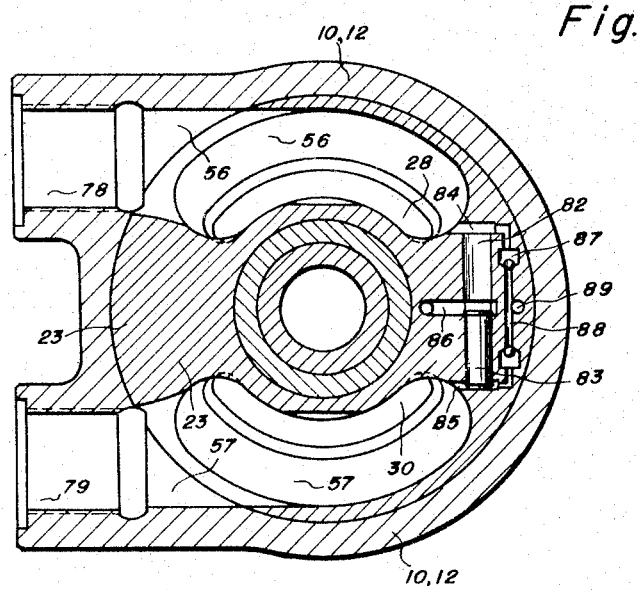

From FIGURE 4 it is visible, that a control cylinder 82 can be provided, wherein a control piston 83 can move axially. Communication passage 84 communicates one end of control cylinder 82 with fluid passage 56 while the communication passage 85 communicates the other end of the control cylinder 82 for example with the fluid passage 57.

From the middle of control cylinder 82 extends the fluid passage 86 for instance into the fluid balancing chamber which contains the balancing ring 90 or it extends therefrom directly or indirectly into the ring grooves 190 or 98 and to the respective communication passages 99 and 100. Depending therein in which of both fluid passages 56 or 57 the high pressure is, the control piston 83 is moving in the opposite direction and thereby always communicates the fluid port of the higher pressure with the passage 86. Therefore, depending on the location of the control piston 83, either fluid passage 56 is in communication with passage 86 via control cylinder 82 or control port 57 communicates via control cylinder 82 with passage 86.

It is also possible to make a passage 89 communicating with certain chambers which contain fluid under pressure inside of the fluid handling device. From fluid passage 89, a respective fluid passage 88 may extend to respective valves 87 and therefrom other passages may be provided for communication with passages 84 or 85 respectively. Therefore, fluid can flow from control passage 89, when under higher pressure, via one of the valves 87 into one of the communication passages 84 or 85, under less pressure than passage 89. Flow reversal is prevented by the valves 87.

If the fluid passage communications are provided, as therefore described, then fluid under high pressure passes out of the respective balancing chambers or out from other spaces under high pressure into the annular grooves 190 and then through the communication passages 99 and 100 into the other annular grooves 98. Out from these annular grooves 98 fluid under pressure is passed into the slots 101, 102, 103, 104 of rotor 1. This fluid under high pressure presses the vanes 2 in radial outward direction. Thereby it is assured, that the vanes are always in their most possible radial outward location and so, that the outer faces of the slide elements are always abuted against the inner faces 47 of the respective casing members. The parts of the slots radially inwards of the vanes 2 are the inner slot spaces, and are designated by the reference numerals 68, 69, 70 and 71.

In the case above described, the interslot spaces 68 to 71 communicate with each other by the annular grooves 98 and therefore the interslot spaces in this case do not act as fluid pumping or fluid motor elements but rather are filled with fluid under high pressure in order to press the vanes outwardly.

It would however be possible, instead of providing an annular groove or annular grooves 98 and 190 with communication passages 100 and 99 therebetween, to provide control ports in the cover means 27 or 28 for communicating the ends of the interslot spaces 68 to 71 with respective fluid passages or with respective control ports (not shown).

For instance, such control ports could be communicated with respective control passages 54, 55, 56 or 57. If that would be done, then also the intervane spaces would during about a half of the revolution, when they increase their volume, take in fluid, and press out fluid, when the vanes 2 are moving radially inwardly during the other half of the revolution. Thereby they would deliver fluid into respective fluid passage or fluid port.

Instead of extending or communicating such control ports with fluid passages 54, 55, 56 or 57 it would also be possible to extend the said ports by respective fluid passages to respective fluid ports in the fluid handling device, so that another independent flow of fluid could flow through the interslot spaces; when, during each revolution the interslot spaces are increasing and decreasing in volume.

It will also be possible to communicate such passages or fluid ports, which are delivery ports, together and such passages or fluid ports, which are intake fluid ports, also to communicate together. In such a case the fluid handling device would have three independent chamber systems, wherein each one of the chamber systems could alternatively take in fluid and expel fluid. These two, three or four independent flows of fluid could be communicated together, so that only one flow of fluid enters the fluid handling device, and thereafter divides into two, three or four flows, each passing through a respective chamber in the device, and which leave the chambers combining together into one flow, which then exits the fluid handling device through a single fluid port.

But that is however only one of several possibilities. It would also be possible to provide separate fluid ports for two or more of the separated flows so that the fluid handling device can either handle two or up to four separate flows as distinguished from a fluid handling device which can accommodate only one flow.

In the case of a single flow, at least two fluid ports are provided on the fluid handling device. In the case of two separate flows there are at least four fluid ports provided. In the case of three separate flows there are at least six fluid ports provided, and in the case of four separate flows there are at least eight fluid ports provided on the fluid handling device. In each case, half of the total number of fluid ports act as delivery ports and the other half of the fluid ports act as fluid intake ports.

Another embodiment of a fluid handling device of the invention is demonstrated in FIGURES 24 to 27. In this case the fluid handling device is provided with very simple plate shaped vanes 702 for easy manufacturing. Another feature of such an embodiment of the fluid handling device of the invention is that each one interslot space and more or less others 7, 72, 773, 774, 775, 776 is communicating with two adjacent intervane spaces 760 and 860, 761 and 861, 762 and 862, 763, and 863, 764 and 864 and more or less others via the space 795 on the top of the respective vane. Consequently each one outer interslot space and each two intervane spaces form together one fluid handling space. The respective inner interslot spaces can also be incorporated in the thus formed fluid handling spaces.

It is therefore possible to bear the vanes in the medial rotor part with the vane ends extending through the respective working chambers on both axial ends thereof to divide the working chambers into a plurality of fluid handling spaces.

In such case it is a special feature of this invention that the vane 702 must not be of the same thickness as the width of the rotor slot 701, 702, 703, 704 etc. is. On the contrary it is possible that the vane 702 can be smaller than the rotor slot, so that the vane and slot both can be very simply machined. It is then satisfactory if only one guide face 705 or 706 is provided on a slot wall and only one bearing face 605 or 606 is provided on the vane 702. The vane must in such a case however have a top face 798 and a substantially sharp edge 799 between the top face 798 of the vane 702 and the bearing face 605 of the vane 702 and this sharp vane edge 799 must extend over the whole length of the vane, so that this vane edge between the bearing face 605 of the vane and the top face 789 of the vane seals along the respective guide face 705 of the slot walls within the medial rotor part 714 and seals along the inner faces 747 of the casing members 731 and 732, while the end faces 742 and 743 of the vane 702 seal along the respective control faces 728 or 729 of the cover means 721 and/or 722.

Another feature of the embodiment is, that the housing is divided into three parts 710, 810 and 910 and fixed together, so that the parts of the housing with the respective passages 754, 755, 756 and 777 therein can be easily cast. Another feature of this embodiment is that the rotor slots 701, 702, 703, 704 and 705 are in the radial outward direction closed by respective uninterrupted parts 781 of the medial rotor part 714, so that the medial rotor part 714 forms an uninterrupted outer face 749. The balancing chambers 776 and or 777 are than balancing the medial rotor part 714 in radial direction, because they are oppositely loaded by fluid under pressure, with respect to the rotor parts 715 and 716 which are pressure loaded by the working chambers.

The balancing chambers 776 and 777 are then respectively communicated with the fluid ports or fluid passages of the fluid handling device, but the communication is such, that the higher pressure acts in that radial balancing chamber 776 or 777, which is diametrically opposite to the rotor.

Thus: by this embodiment, a special stabilized rotor 1 is provided which has a high strength in the tangential direction due to the uninterrupted parts outwards of the rotor slots within the medial rotor part 714 and another feature is that the vanes of this embodiment are very simple to be manufactured.

This particular embodiment however will in most cases be used either as a compressor or a constant delivery pump or as a constant hydromotor.

Another feature of the invention is that the rotor 1 extends entirely or can extend entirely through the fluid handling device. It is therefore possible to assemble one fluid handling device axially behind another, or a plurality of fluid handling devices axially connected each one behind another, and by providing a clutch means between the common shaft of such devices, one driving motor, engine or turbine can operate to drive a plurality of fluid handling devices of the invention.

It is possible to exchange parts one of embodiment into other embodiments and vice versa. For instance to substitute the rotor 702 of the latter embodiment into the device of the first embodiment of FIGURES 1 to 7. The embodiment of FIGURES 1 to 7 would then have a stronger rotor and if necessary, passages could then be provided through the uninterrupted outer parts 781 of the rotor 702.

Since all rotary parts in the basic structure are cylindrical and since the axes of the rotor and of the rotary capsule ring are distanced from each other by the eccentricity "e" it is possible to calculate the vane stroke as well as the chamber volume almost exactly as a function of the angle α between the dead center position and the centre line of a vane.

The radius of the forward- or backward-rotor part is r and the radius of the inner face of a casing member is R. The axial length of an intervane space is B.

The length f of the vane portion, which extends out of the rotor is $$f = a - f \tag{1}$$

The length from the rotor axis through a vane of the thickness zero to the inner face of the casing member is a, which can be calculated by:

$$a = e \cos \alpha + R \cos \beta \tag{2}$$

and therefrom follows after several calculations a convenient equation for a as a function of α which reads:

$$a = e \cos \alpha + R - \frac{e^2}{2R} \sin^2 \alpha \tag{3}$$

The latter will be a suitable basic equation for all calculations of the fluid handling device engine, compressor or motor. It follows:

$$f = (a - r) = e \cos \alpha + R - r - \frac{e^2}{2R} \sin^2 2\alpha \tag{4}$$

After several calculations it follows that the radial velocity of the vane $V_F$ is $$V_F = \frac{da}{dt} = -\omega \left[ e \sin \alpha + \frac{e^2}{2R} \sin 2\alpha \right] \tag{5}$$

and the radial acceleration of the vane $b_F$ is:

$$b_F = \frac{dV_F}{dt} = \omega^2 \left[ -e \cos \alpha - \frac{e^2}{R} \cos 2\alpha \right] \quad (6)$$

The mean radial velocities and accelerations of the vane are:

$$V_{Fmean} = -4eUps \quad (7)$$

and $$b_{F\ mean} = \frac{\omega^2}{\pi}(o) = 0 \quad (8)$$

The angle between two adjacent vanes of thickness zero is $\theta$, so that the angle between the second vane and the face through the axes becomes $(\alpha - \theta)$.

As is seen from Equation 3 the value $a$ is a function of $\alpha$. From calculus it is known, that the integral of a function gives the area F below the function between the upper and lower limits of integration.

Area F over the function $a$ between the limits and $(\alpha - \theta)$ and $\alpha$ becomes:

$$F = \int_{\alpha-\theta}^{\alpha} \left[ e \cos \alpha + R - \frac{e^2}{2R} \sin^2 \alpha \right] d\alpha \quad (9)$$

The integration of Equation 9 gives:

$$F = e \sin \alpha + R\alpha - \frac{e^2}{4R}\alpha + \frac{e^2}{8R} \sin 2\alpha -$$

$$e \sin(\alpha-\theta) - R(\alpha-\theta) + \frac{e^2}{4R}(\alpha-\theta) \frac{e^2}{8R} \sin 2(\alpha-\theta) \quad (10)$$

Further is known from mathematics, that the division of F by the difference between the boundaries of the integral gives the integral mean value A of the function $a$ between the boundaries of integration.

A is the integral mean value of $a$ between the two adjacent vanes of thickness zero.

It would be the circle with radius A around the rotor axis. The circle section thereby defined has the same sectional area as the sectional area between the inner face of the casing member and the adjacent vanes of thickness zero, extend to the rotor axis.

The value A becomes found by dividing F through $\theta$ is given by:

$$A = R + \frac{1}{\theta} \left[ e \sin \alpha - e \sin(\alpha-\theta) - \frac{e^2}{4R}\alpha + \frac{e^2}{4R}(\alpha-\theta) + \frac{e^2}{8R} \sin 2\alpha - \frac{e^2}{8R} \sin 2(\alpha-\theta) \right] \quad (11)$$

or $$A = R - \frac{e^2}{4R} + \frac{e}{\text{arc } \theta} \sin \alpha - \frac{e}{\text{arc } \theta} \sin(\alpha-\theta) + \frac{e^2}{8R \text{ arc } \theta} \sin 2\alpha - \frac{e^2}{8R \text{ arc } \theta} \sin(\alpha-\theta) \quad (12)$$

The mentioned circle section with A as radius is $$F = A^2 \pi \frac{\theta}{360} \quad (13)$$

Therefrom the sectional area Fcrs, of the rotor part between two neighbouring vanes is to be subtracted in order to receive the sectional area K through an intervane space for the device; in case the vanes are of the thickness zero.

This sectional area through an intervane space with vanes of thickness zero is:

$$K_1 = A^2 \frac{\pi\theta}{360} - r^2 \frac{\pi\theta}{360} \quad (14)$$

or $$K_1 = \left[ R - \frac{e^2}{4R} + \frac{e \sin \alpha}{\text{arc } \theta} - \frac{e \sin(\alpha-\theta)}{\text{arc } \theta} + \frac{e^2 \sin 2\alpha}{8R \text{ arc } \theta} - \frac{e^2 \sin 2(\alpha-\theta)}{8R \text{ arc } \theta} \right]^2 \frac{\pi\theta}{360} - \frac{r^2\pi\theta}{360} \quad (15)$$

In Equations 12 to 15 the value $\theta$ is to be inserted in degrees, while the value arc $\theta$ is the arcus value of the angle $\theta$, which can be calculated by $\theta$ in degrees multiplied by $\pi$ and divided by 180 according the Equation 16.

$$\text{arc } \theta = \frac{\theta\pi}{366} \quad (16)$$

The length of the intervane space, equal to the length of the casing member is B, wherefrom follows, that the volume 1 of an intervane space of a device of the invention, if it would have plane straight vanes of the thickness zero, is:

$$I_1 = K_1 B \quad (17)$$

For calculation of the torque on the rotor where the fluid handling device acts a fluid motor, the vane stroke is designated as $dr$ and the pressure in the intervane space is $p$. Then the torque acting on the vane becomes:

$$dMd_F = pBrdr \quad (18)$$

and $$Md_F = \int_{r1}^{r2} pBrdr \quad (19)$$

or $$Md_F = \frac{pB}{2}[r_2^2 - r_1^2] \quad (20)$$

or with $r_2 = r + f$ $$Md_F = pBf(r + f/2) \quad (21)$$

wherein $f$ can be obtained from Equation 4.

The pressure in the intervane space $p$ acts however, not only on one vane, but on two. Due to the eccentricity, the vanes have different lengths extending from their rotor slots, which are referred to by $f$ and $g$. However the pressure $p$ in the space can be considered as being of substantially equal throughout the intervane space.

The torque $MdK_1$ produced by the pressure in an intervane space is equal to the difference of torque on both adjacent vanes, and is given by:

$$MdK_1 = \frac{pB}{2}[2rf - 2rg + f^2 - g^2] \quad (22)$$

The torque of an engine having plane vanes of thickness zero can now be calculated by two ways:

(1) Add the positive torques of all vanes and subtract therefrom the negative torques of all vanes, or alternatively (2) Add the torques of all positive torque intervane spaces and subtract the torques of all negative torque intervane spaces.

For more accurate calculation the thickness of the vanes and the pivoting volume of the slide element around the axis of the pivot pin should be taken into consideration.

Therefore $m$ designates the sectional areas of the parts of straight vanes of thickness $m$, which extends into the intervane space. The volumes BT$f$ and BT$g$ of the vane parts are to be subtracted from $K_1$. The volume of the parts of the vanes, which narrow the volume of the intervane space, are:

$$T = sB(f + g) \quad (23)$$

with $s = \frac{m}{2} =$ the half of the thickness of the vane;

$$\quad (23)$$

or $$T = sB\left[ 2R - 2r + e \cos \alpha + e \cos(\alpha-\theta) - \frac{e^2}{2R} \sin^2 \alpha - \frac{e^2}{2R} \sin^2(\alpha-\theta) \right] \quad (24)$$

W and H are the cross sections through the pivoting volume WB or HB of the volume, which adds to or subtracts from the intervane space due to the pivoting of the slide element around the axis of the respective pivot pin. The distance from the pivot pin axis to the inner face of the casing member is L.

The volumes WB and HB for addition or subtraction to the volume of the intervane space can then be obtained by the simplified equations:

$$HB = \frac{L^2 e \sin \alpha B}{2(R-L)} \quad (25)$$

and $$WB = \frac{L^2 e \sin (\alpha - \theta) B}{2(R-L)} \quad (26)$$

Hereafter the actual volume J, of an intervane space can almost exactly be calculated by:
One receives:

$$J_1 = I_1 - T + B - WB \quad (27)$$

or $$J_1 = \left\{ \left[ R - \frac{e^2}{4R} + \frac{e \sin \alpha}{\text{arc } \theta} - \frac{e \sin (\alpha - \theta)}{\text{arc } \theta} + \frac{e^2 \sin 2\alpha}{8R \text{ arc } \theta} - \frac{e^2 \sin 2(\alpha - \theta)}{8R \text{ arc } \theta} \right]^2 \cdot \frac{\pi \theta B}{360} - \frac{r^2 \pi \theta B}{360} - sB \left[ 2R - 2r + e \cos \alpha + e \cos (\alpha - \theta) - \frac{e^2 \sin^2 \alpha}{2R} - \frac{e^2 \sin^2 (\alpha - \theta)}{2R} \right] + \frac{L^2 Be \sin \alpha}{2(R-L)} - \frac{L^2 Be \sin (\alpha - \theta)}{2(R-L)} + D_s - E_v \right\} \quad (28)$$

wherein dead spaces Ds, which are generally constant volumes, are added, while dead space fillers Ev, or parts extending into the intervane spaces, the latter also are generally of constant volumes, are substracted.

The most important dead space volumes are the rotor recesses or rotor passages. The most significant parts extending into the working chambers are, if so provided, the dead space fillers. However, due to the actual design of rotors and vane assemblies, there may be additional dead spaces or volumes of parts extending into the working chamber.

With the above equation as the base, all important torque, compression, expansion, power, efficiency, and thermodynamic values can be calculated by substituting J: or others of the above equations into the known equations of fluid mechanics or thermodynamics.

It is to be recognized, that if the vane is provided with suitable balancing recesses in its bearing faces, the vane floats, while the torque providing power of the fluid is acting directly on the walls of the slots.

The force $P_F$ of the fluid in the working chamber J, acts with pressure P against the vane along the face Bf, wherein B represents length and f represents the length of the vane out of the rotor. Therefore force Pf becomes $$P_F = pBf \quad (29)$$

Each half of the force $P_F$ is transferred through into each of the balancing recesses.

The radial extension of a balancing recess is represented by $r_F$ while the axis length may by $L_a$, so that in principle the cross sectional area $r_A$ of a balancing recess becomes $$r_A = r_F \cdot L_A = \frac{1}{2} BF \quad (30)$$

The force $P_F/2$ acts in the tangential direction, which is normal to the rotor slot wall face and acts as fluid pressure directly thereagainst.

Now it shall be assumed, that each vane has two balancing recesses in each bearing face, each one of the length La, so that the equations of this consideration can also be used for calculating vane machines of my elder patents, such as, U.S.A. Patents 2,975,716; 3,099,964; 3,111,905 or British Patents 744,446; 921,998; 921,997; Japanese Patents 225,237; 269,395; 277,436; 301,407; 301,408; or others; wherein the vanes are guided in slots in rotor side walls.

Therefrom follows, that the total of fluid forces $PF_{rs}$ which act normally against the slot walls is:

$$P_{FRS} = 2(\tfrac{1}{2} Bf) P = Bfp = P_F \quad (31)$$

The forces of fluid Pb acting out of the balancing recesses in oppositional direction of $PF_{rs}$ against the vane, are equal, but in opposite direction to the forces $PF_{rs}$ and thereby also to $P_F$ and are designated by Pb. We obtain from the above explanation:

$$P_b = -P_F rs - P_F = -\tfrac{2}{2} pBf = -2pr_F L_A \quad (32)$$

The forces of fluid $F_T$ acting in the tangential direction normal against the vane are therefore, $$F_T = pBf + 2pr_F L_A - 2pr_F L_A = pBf \quad (33)$$

wherefrom it follows, that the vane floats without resultant forces in the rotor wall slot.

Thus, torque is in such novel cases not transmitted to the rotor by the vanes but rather is transmitted directly to the rotor by the fluid pressure force.

The vanes function, in this novel case, practically only as controllers for separation of chambers and for guiding or controlling fluid.

Accordingly the vanes travel substantially frictionless and have a greater useful life.

For actual use however, the forces acting in clearance spaces surrounding or in the region of the vanes, are to be taken into consideration.

The actual size $r_F La$ of the balancing recess is then so dimensioned, that the force equilibrium on the vane is maintained against fluid forces acting through clearances in the region of the vane.

The value $pr_F La$ becomes then slightly unequal to the $pf/2$ value.

It is preferred to make La about equal to B/2, then $r_F$ will become about equal to F.

In such cases the Equations 4, 21, 22 can also be used for finding the approximate sizes of the balancing recesses radial extensions for various values of the rotary angle $\alpha$ as a function of $\alpha$.

The delivery of hydraulic fluid by each interslot space or inner interslot space of the fluid handling device can be calculated by $$Q = -\omega \left( e \sin \alpha + \frac{e^2}{2R} \sin 2\alpha \right) A_{pm} \quad (35)$$

wherein $A_{pm}$ is the effective cross sectional area through the respective pump means; i.e. vane or piston; normal to its radial axis.

For calculating the delivery of an outer inter-slot space, the minus sign in Equation 35 is changed to a positive sign.

The total delivery of the fluid becomes $\Sigma Q$ = the sum of all delivery of all active pumping spaces. The power in the flow of fluid delivered from the fluid handling device is:

$$N = \frac{\Sigma Q P \eta}{450} \quad (36)$$

with $N = PS$; $Q = Ltr/\min$.; and $P = K_p/cm^2$.
$\eta$ is the respective efficiency.

By the invention described in principle above by way of some embodiments of a complete fluid handling device or of parts thereof, a very simple device is disclosed, which works perfectly and which can be easily and inexpensively machined. Furthermore the device provides fluid pressure balancing, and stable bearing of the vanes, as well as an almost perfect seal of the fluid handling spaces or chambers for a long useful life.

Another modification of the invention is, to set a ring around the medial rotor part for closing the slot portions in the medial rotor part in outward direction. Still another modification is, to reverse the movements of the vanes by forming the rotor as a hollow body with the fluid handling spaces and casing parts provided radially inward of the hollow rotor and with the medial rotor part extending radially inwardly. Still another modification is, to make the vanes thinner than the width of the slots, so that a space remains between one vane face and one slot wall for communicating the inner and outer interslot spaces.

Care must be taken, that the rotor and the vanes can move relative to the cover means bearing or control faces thereon. That can be assured by making the vane assemblies or vanes and rotor parts somewhat short, so that enough clearance remains on their ends.

The invention disclosed and claimed in this application can be modified in design for particular applications in many ways without departing from the scope of the invention. However, it is intended that the invention be limited only by the following claims in which I have endeavored to claim all inherent novelty.

What I claim is:

1. A fluid handling device comprising a housing; a rotor rotatably mounted in said housing and containing vanes, each with a radially extending medial vane portion and end portions extending axially therefrom, in slots of said rotor, which move substantially radially upwards and outwards in said slots; a radially enlarged medial rotor part and end portions axially disposed on said medial rotor part provided on said rotor; slot portions located in said medial rotor part, for guiding the medial portions of said vanes on walls of said slots in said medial rotor part; shaft portions extending axially from said rotor; cover means provided on said housing engaging each one rotor end; each one casing member enclosing each a part of the rotor end portions axially of said medial rotor part; each one working chamber formed between an end portion of the rotor, the medial rotor part, a casing member and a cover means and separated from each other by said radially enlarged rotor part, said working chambers being divided by said axially extending end portions of said vanes into a plurality of intervane spaces which periodically increase and decrease their volume and intake and expel fluid when the inner faces of said casing members at different angular locations are differently distanced from the axis of the rotor, while said rotor revolves respectively to said housing; and passage means for passing fluid into and out of said intervane spaces of said working chambers.

2. The fluid handling device of claim 1 wherein said housing is stationary while said rotor is revolving.

3. The fluid handling device of claim 1 wherein said rotor is stationary while said housing is revolving.

4. The fluid handling device of claim 1 wherein each one entrance passage and each one delivery passage are extending through one of the said cover means to one of said working chambers.

5. The fluid handling device of claim 4 wherein said cover means are disposed to define control faces, each control face abutting an end face of a rotor end portion and said passages define control ports in said control faces.

6. The fluid handling device of claim 5 wherein the end faces of the vanes are disposed for sliding along said control faces.

7. The fluid handling device of claim 5 wherein each vane has a longitudinal bed extending axially through the vane containing a pivot pin of the length of the vane and slide elements pivotally borne on said pivot pin.

8. The fluid handling device of claim 1 wherein each casing member is fitted between said medical rotor part and one of said cover means.

9. The fluid hnadling device of claim 8 wherein said casing members are radially adjustable.

10. The fluid handling device of claim 7 wherein said slide elements have outer faces which slide along the inner face of the respective casing member.

11. The fluid handling device of claim 1 wherein fluid containing balancing recesses are provided in the medial vane portion extending through the bearing face into the vane.

12. The fluid handling device of claim 11 wherein communication passages are provided through the vane assembly for communicating the fluid containing balancing recess with at least one intervane space which is located tangentially oppositely respective to the vane assembly.

13. The fluid handling device of claim 10 wherein at least one fluid containing balancing recess is provided in the slide element extending through the outer face into the slide element.

14. The fluid handling device of claim 13 wherein communication passage means are provided for communicating the respective fluid containing balancing recess with an adjacent intervane space.

15. The fluid handling device of claim 1 wherein a medial casing of annular configuration is provided in said housing surrounding the radially enlarged medial rotor part and including an inner face on said medial casing disposed for sealing and relative sliding engagement with an outer face on said medial rotor part.

16. The fluid handling device of claim 15 including fluid passages extending through the medial casing for passing fluid from and into control ports provided in the medial casing.

17. The fluid handling device of claim 16 wherein the control ports extend through the inner face into the medial casing for fluid flow into and out of outer slot spaces in the medial rotor part radially outwards of the vanes, when the medial portions of the vanes periodically increase and decrease the volume of the outer slot spaces during revolving of the rotor.

18. The fluid handling device of claim 15 including a ring means provided between the medial casing and the radially enlarged medial rotor part for closing the slot portions in the said medial rotor part in the radially outwards direction and for stabilizing the rotor.

19. The fluid handling device of claim 18 wherein said ring means is fastened on the medial rotor part.

20. The fluid handling device of claim 1 wherein said vanes divide the slots into outer and inner interslot spaces and each vanes separates an inner-interslot space from an outer interslot space.

21. The fluid handling device of claim 20 wherein each of the intervane spaces and each of the interslot spaces forms a fluid handling space, which intakes fluid, when it increases its volume and which expels fluid, when it decreases its volume.

22. The fluid handling device of claim 1 as arranged to accommodate one flow of fluid through the intervane space radially of the forward rotor end portion, while another flow of fluid flows through the intervane spaces radially of the backward rotor end portion.

23. The fluid handling device of claim 1 wherein annular recesses are provided for communicating the inner interslot spaces with each other and for passing fluid out of some of them into others.

24. The fluid handling device of claim 23 wherein the annular recesses or the inner slot spaces are communicated with spaces in the device which contain fluid under pressure, so that the fluid in the inner slot spaces is under pressure and presses the vanes radially outwards.

25. The fluid handling device of claim 20 wherein passages are provided through parts of the device for extending into control ports which periodically communicate with some of the inner interslot spaces when the rotor revolves, so that a flow of fluid flows through the inner slot spaces such, that each inner slot space takes in fluid when it increases its volume and expels fluid when it decreases its volume.

26. The fluid handling device of claim 20 as arranged to accommodate at least three separated fluid flows through the device, for reaction with the rotor therein, wherein one flow of fluid flows through the intervane spaces in the region of the forward rotor part, another flow of fluid flows through the intervane spaces in the region of the backward rotor part, and a third flow of fluid flows through the outer interslot spaces and the inner interslot spaces.

27. The fluid handling device of claim 26 wherein all flows have separated entrance and exit ports or wherein all or some entrance portions of entrance passages are communicating and extend to one common entrance port and all or some exit portions of exit passages are communicating and extend to one common exit port.

28. The fluid handling device of claim 1 wherein an axialward movable adjustable cover is provided in the housing and able to abut against a rotor end member end face and against vane end faces, pivot pin end faces, slide element end faces, and a casing member end face.

29. The fluid handling device of claim 28 wherein an outer cover is provided and retained in the housing of the device while at least one fluid containing axial balancing chamber is provided between said outer cover and the adjustable cover and at least one of said axial balancing chambers communicates with spaces which contain fluid under pressure, so that the adjustable cover is pressed axially inwards by the pressure in fluid in the respective balancing chamber.

30. A fluid handling device comprising a housing; a rotor rotatably mounted in said housing and containing vanes in slots of said rotor, which move substantially radially inwards and outwards in said slots; a radially enlarged medial rotor part provided in said rotor; slot portions located in said medial rotor part, for guiding the center portions of said vanes on walls of said slots in said medial rotor part; shaft portions extending axially from said rotor; cover means provided on said housing engaging each one rotor end; each one casing member enclosing each an end portion of the rotor axially of said medial rotor part; each one working chamber formed between an end portion of the rotor, the medial rotor part, a casing member and a cover means; said working chambers divided by said vanes into a plurality of intervane spaces which periodically increase and decrease their volume and intake and expel fluid when the inner faces of said casing members are at different angular locations are differently distanced from the axis of the rotor, while said rotor revolves respectively to said housing; said working chambers separated from each other by said medial rotor part; passage means for passing fluid into and out of said intervane spaces and working chambers; and wherein said slot portions in the medial rotor part are closed in radial outward direction by parts of the medial rotor part which connect neighboring segments of the medial rotor part together, so that the slot portions in the axial length of the medial rotor part are radially entirely closed by an integral medial rotor part.

31. A fluid handling device comprising a housing; a rotor rotatably mounted in said housing and containing vanes in slots of said rotor, which move substantially radially inwards and outwards in said slots; a radially enlarged medial rotor part provided in said rotor; slot portions located in said medial rotor part, for guiding the center portions of said vanes on walls of said slots in said medial rotor part; rotor end portions extending axially from said medial rotor part; shaft portions extending axially from said rotor; cover means provided on said housing engaging each one rotor end; each one casing member enclosing each a rotor end portion axially of said medial rotor part; each one working chamber formed between an end portion of the rotor, the medial rotor part, a casing member and a cover means, said working chamber divided by said vanes into a plurality of intervane spaces which periodically increase and decrease their volume and intake and expel fluid when the inner faces of said casing members at different angular locations are differently distanced from the axis of the rotor while said rotor revolves respectively to said housing; passage means for passing fluid into and out of said intervane spaces or working chambers; and wherein each slot provides at least one slot space and at least a part of each slot space communicates with each adjacent intervane space axially, of the medial rotor part and radially of each one of said rotor end portions.

32. A fluid handling device comprising a housing; a rotor rotatably mounted in said housing and containing vanes in slots of said rotor, which move substantially radially inwards and outwards in said slots; a radially enlarged medial rotor part provided in said rotor; slot portions located in said medial rotor part, for guiding the center portions of said vanes on walls of said slots in said medial rotor part; shaft portions extending axially from said rotor; cover means provided on housing engaging each one rotor end; each one casing member enclosing each an end portion of the rotor axially of said medial rotor part; each one working chamber formed between an end portion of the rotor, the medial rotor part, a casing member and a cover means, said working chambers divided by said vanes into a plurality of intervane spaces which periodically increase and decrease their volume and intake and expel fluid when the inner faces of said casing member at different angular locations are differently distanced from the axis of the rotor, while said rotor revolves respectively to said housing; passage means for passing fluid into and out of said intervane spaces or working chambers; and wherein the vanes have a top face and a straight vane edge formed between the longitudinal bearing face of the vane and the top face of the vane, while said straight vane edge abuts and seals partially along the respective guide face of the wall of the slot portion in the medial rotor part and partially along the inner face of the casing members.

33. The fluid handling device of claim 32 wherein a space is formed between the top face of the vane and the inner face of the respective casing member and wherein said space communicates with the adjacent intervane space and at least also with the outer slot space so that at least one portion of a slot forms together with one intervane space in the region of one rotor end portion and with one intervane space in the region of the other rotor end portion a fluid handling space which is sealed in one tangential direction by the straight longitudinal vane edge.

34. The fluid handling device of claim 33 wherein the vane is thinner than the width of the slot, so that a space remains between one face of the vane and one wall of the slot wherethrough the outer and the inner slot spaces communicate together for forming together one whole slot space.

35. The fluid handling device of claim 32 wherein the vane is guided on a wall of a slot portion in the medial rotor part.

36. The fluid handling device of claim 32 wherein the vanes have end faces on its axial ends and said end faces slide along the control faces of the cover means and seal thereagainst for sealing respective intervane spaces in tangential direction.

37. The fluid handling device of claim 1 wherein the rotor is a substantial annular hollow body wherefrom the medial rotor part extends radially inwardly and the casing parts are located inwardly of the hollow rotor, the fluid handling spaces are located inwards of the hollow rotor and the vanes move radially in oppositional direction when the fluid handling device handles fluid as claimed in claim 1.

References Cited by the Examiner
UNITED STATES PATENTS

| | | | |
|---|---|---|---|
| 1,818,611 | 8/1931 | Ernst | 103—120 |
| 1,974,761 | 9/1934 | Vogel | 103—136 |
| 1,988,213 | 1/1935 | Ott | 103—120 |
| 2,238,062 | 4/1941 | Kendrick | 103—120 |
| 2,750,895 | 6/1956 | Sturm | 103—120 |
| 2,883,937 | 4/1959 | Lauck | 103—120 |
| 2,975,716 | 3/1961 | Erickmann | 103—120 |
| 2,982,219 | 5/1961 | Rosaen | 103—120 |
| 3,052,189 | 9/1962 | Head | 103—120 |
| 3,187,676 | 6/1965 | Hartmann | 103—120 |

DONLEY J. STOCKING, *Primary Examiner.*

WILBUR J. GOODLIN, *Examiner.*

UNITED STATES PATENT OFFICE
CERTIFICATE OF CORRECTION

Patent No. 3,320,897                            May 23, 1967

Karl Eickmann

It is hereby certified that error appears in the above numbered patent requiring correction and that the said Letters Patent should read as corrected below.

Column 1, line 70, before "axial" insert -- the --; column 3, line 30, for "XXIII-XXVIII" read -- XXIII-XXIII --; line 53, for "separate illustrations" read -- separated illustration --; column 4, line 3, strike out "substantially"; column 5, line 46, for "cited" read -- designated --; column 6, line 12, for "parts" read -- part --; line 63, for "move," read -- move --; column 7, line 57, for "other" read -- others --; column 8, line 53, for "and" read -- or --; column 10, line 20, for "to be manufactured" read -- to manufacture --; column 10, line 53, for "f=a-f" read -- f=a-r --; line 69, the formula should appear as shown below instead of as in the patent:

$$f=(a-r)=e\ \cos\alpha + R - r - \frac{e^2}{2R} \sin^2 \alpha$$

column 13, line 22, strike out "One receives:"; column 15, line 35 and 36, for "upwards" read -- inwards --; column 16, line 4 for "medical" read -- medial --; line 54, for "vanes" read -- vane --; column 20, line 3, for "Erickmann" read -- Eickmann --.

Signed and sealed this 9th day of January 1968.

(SEAL)
Attest:

EDWARD M. FLETCHER, JR.                      EDWARD J. BRENNER
Attesting Officer                            Commissioner of Patent